United States Patent
Tsugawa et al.

(10) Patent No.: US 9,523,997 B2
(45) Date of Patent: Dec. 20, 2016

(54) PUSH-BUTTON SWITCH, SELECTOR SWITCH, AND FIXING COMPONENT THEREFOR

(71) Applicant: OMRON CORPORATION

(72) Inventors: Hiroshi Tsugawa, Izumo (JP); Hiroyuki Moriyama, Tohaku-District (JP)

(73) Assignee: OMRON CORPORATION, Kyoto-shi, Kyoto (JP)

( * ) Notice: Subject to any disclaimer, the term of this patent is extended or adjusted under 35 U.S.C. 154(b) by 221 days.

(21) Appl. No.: 14/034,892

(22) Filed: Sep. 24, 2013

(65) Prior Publication Data
US 2014/0086674 A1 Mar. 27, 2014

(51) Int. Cl.
*F16B 21/04* (2006.01)
*G05G 1/02* (2006.01)
(Continued)

(52) U.S. Cl.
CPC .............. *G05G 1/025* (2013.01); *F16B 21/04* (2013.01); *H01H 3/12* (2013.01); *H01H 13/04* (2013.01);
(Continued)

(58) Field of Classification Search
CPC ............. F16B 7/20; F16B 21/02; F16B 21/04; G05G 1/02; G05G 1/025; H01H 3/12; H01H 13/00; H01H 13/04; H01H 13/10; H01H 13/14; H01H 19/003; H01H 2223/014; H01H 2223/018; H01H 2223/028
(Continued)

(56) References Cited

U.S. PATENT DOCUMENTS

| | | |
|---|---|---|
| 4,315,123 A | 2/1982 | Fujita et al. |
| 6,254,303 B1 * | 7/2001 | Falat et al. .................. 403/348 |

(Continued)

FOREIGN PATENT DOCUMENTS

| | | | |
|---|---|---|---|
| EP | 1694106 | * | 8/2006 |
| EP | 2624674 A1 | | 8/2013 |

OTHER PUBLICATIONS

Idec Flush silhouette switch LW series control unit; Internet, http://www.idec.com/jpja/products/Catalogs/Switches/FLUSH_LW/index.html; Dated Dec. 28, 2010.
(Continued)

*Primary Examiner* — Josh Skroupa
(74) *Attorney, Agent, or Firm* — Shinjyu Global IP

(57) ABSTRACT

A fixing component for a switch including a flange, a ring attachment, and a screw attachment, the flange including a projection provided on an outer peripheral surface, the screw attachment including, on an inner peripheral surface, an insertion area into which the projection of the flange is inserted, a projection engaging part into which the projection of the flange is fitted, and an interference projection which is formed between the projection engaging part and the insertion area and has a smaller inner diameter than diameters of the projection engaging part and the insertion area, the projection of the flange including a first projecting portion and a second projecting portion where the first projecting portion is fitted into a guiding groove, and the second projecting portion is configured to traverse the interference projection to be fitted into a fitting groove when the flange and the screw attachment are rotated relatively.

5 Claims, 7 Drawing Sheets

(51) Int. Cl.
*H01H 3/12* (2006.01)
*H01H 13/14* (2006.01)
*H01H 13/04* (2006.01)
*H01H 13/10* (2006.01)

(52) U.S. Cl.
CPC .............. *H01H 13/10* (2013.01); *H01H 13/14* (2013.01); *H01H 2223/014* (2013.01); *Y10T 403/56* (2015.01); *Y10T 403/7007* (2015.01); *Y10T 403/7015* (2015.01); *Y10T 403/7073* (2015.01)

(58) Field of Classification Search
USPC ................ 403/348, 349, 166, 299, 353, 375
See application file for complete search history.

(56) References Cited

U.S. PATENT DOCUMENTS

2010/0006411 A1   1/2010  Iordache
2012/0155957 A1*  6/2012  Colombo et al. ............. 403/345

OTHER PUBLICATIONS

European Search Report for corresponding application EP13186202 completed Dec. 20, 2013; Mail date Jan. 9, 2014.

* cited by examiner

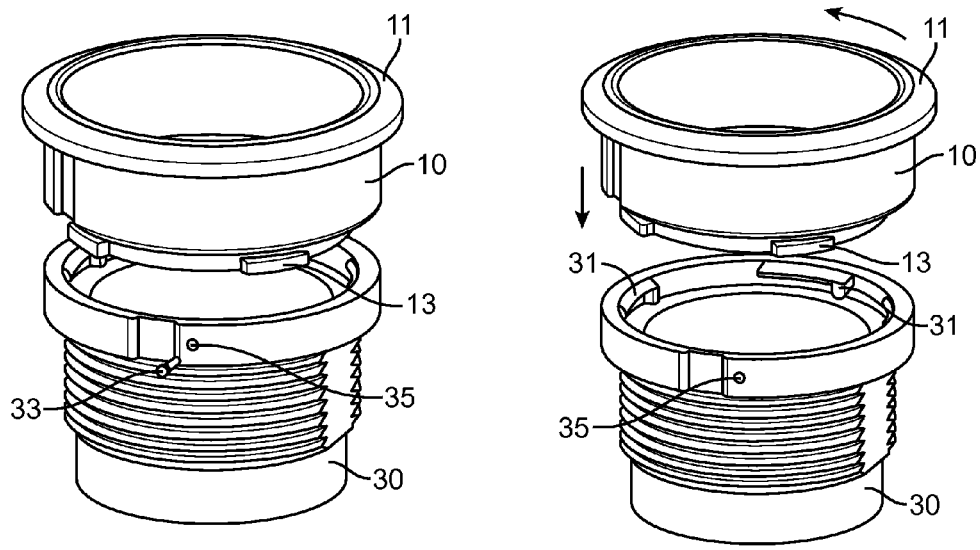
FIG. 9A
(PRIOR ART)
FIG. 9B
(PRIOR ART)
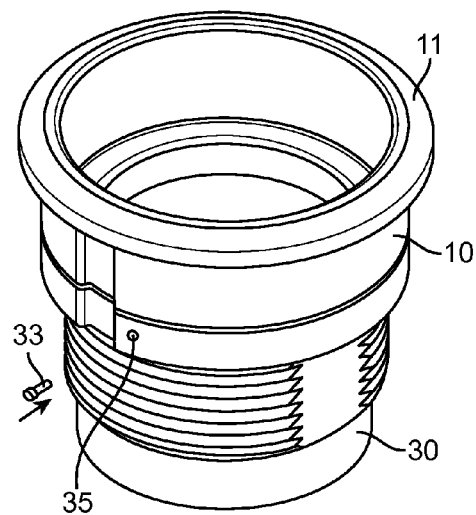
FIG. 9C
(PRIOR ART)

PUSH-BUTTON SWITCH, SELECTOR SWITCH, AND FIXING COMPONENT THEREFOR

CROSS REFERENCE TO RELATED APPLICATION

This application claims benefit of priority to Japanese Patent Application No. 2012-215193, filed on Sep. 27, 2012 of which the full contents are herein incorporated by reference.

BACKGROUND OF THE INVENTION

The present invention relates to a push-button switch, a selector switch and a fixing component therefor.

Heretofore, push-button switches have been used as a switch for consumer-oriented appliances. As an example of a push-button switch, there has been known a switch described in FIGS. 8A and 8B. As illustrated in FIG. 7, the push-button switch 2 is a switch fixed to a device casing, and includes an operation unit 601 and a switch unit 701. Every time a pressing portion in the operation unit 601 is pressed, the switch unit 701 is switched between the on-state and off-state.

A push-button switch 2 is generally fitted into a hole provided on a device casing and is fixed to the device casing with the pressing portion exposed outside the device casing. Specifically, parts of the components which constitute the operation unit 601 of the push-button switch 2 serve to fix the push-button switch to the device casing. This fixing component include a flange 50, a screw attachment 70, and a support member 80 having an opening which is approximately as large as a diameter of the screw attachment 70, and a ring attachment 90 illustrated in FIGS. 8A and 8B. The flange 50 and the screw attachment 70 each are a substantially cylindrical shape and have a spring, a slider, and the like therein for achieving a piston movement of the pressing portion.

The screw attachment 70 and the ring attachment 90 can be fastened by a screw structure. In the screw attachment 70, the flange 50 is attached to the opposite side to which the ring attachment 90 is connected. The attachment of the push-button switch 2 to the device casing can be done in such a manner that the screw attachment 70 with the flange 50 attached thereto is inserted into a mounting hole formed in the device casing from the front side of the casing, and then the ring attachment is fitted into the screw attachment 70 and fastened with a hole edge of the device casing being sandwiched between a flange portion of the flange 50 and the support member 80 disposed on the back side of the device casing.

The flange 50 and the screw attachment 70 are connected by engaging a pair of triangle projections 51 formed on an outer peripheral surface of a lower portion of the flange 50 with a pair of small holes 71 provided at corresponding locations on an upper portion of the screw attachment 70.

On the other hand, in addition to the configuration of FIGS. 8A and 8B, a mechanism that connects a flange with a screw attachment is described in IDEC "Flush silhouette switch LW series control unit", http://www.idec.com/jpja/products/Catalogs/Switches/FLUSH_LW/index.html>. Specifically, as illustrated in FIGS. 9A to 9C, fixing components of an operation unit 601 are a flange 10, a screw attachment 30, a support member having an opening which is approximately as large as a diameter of the screw attachment 30 (not shown because it is similar to the one illustrated in FIG. 8B), and a ring attachment (not shown because it is similar to the one illustrated in FIG. 8B).

At multiple points in the screw attachment 30, there is provided a guide member 31 extending along a circumferential direction on an inner peripheral surface of an upper portion thereof. At multiple points in the flange 10, there is provided a hook 13 extending along a circumferential direction on an outer peripheral surface of a lower portion thereof. The screw attachment 30 and the flange 10 are engaged by inserting each of the hooks 13 into each of the guide members 31 and rotating the flange 10 with respect to the screw attachment 30 to a dead end. Further, in proximity to an insert opening of the guide member 31 in the upper portion of the screw attachment 30, a screw fixing hole 35 is provided. A set screw 33 is screwed into the screw fixing hole 35, and, movement of the hook 13 is prevented by blocking the insert opening of the guide member 31 with the set screw 33.

However, in the technology described in IDEC "Flush silhouette switch LW series control unit", in order to fix the flange 10 to the screw attachment 30, the set screw 33 is required for preventing the hook 13 from moving, and the number of component parts is correspondingly increased. In addition to that, in order to fix the flange 10 to the screw attachment 30 more firmly, an adhesive substance is required.

On the other hand, in the technology illustrated in FIGS. 8A and 8B, the flange 50 is fixed to the screw attachment 70 simply by inserting the flange 50 into the screw attachment 70 so that each of the projections 51 is engaged with each of the holes 71. Therefore, when a strong force is applied to the screw attachment 70, the screw attachment 70 is unable to withstand the force. In other words, when the push-button switch is attached to the device casing, the screw attachment 70 is required to be sufficiently fastened by the ring attachment 90. Therefore, due to the fastening force, the projection 51 and the edge of the hole 71 are pressed against each other, which leads to a breakage of the projections 51. Specifically, the projection 51 is broken at fastening torque 2N·m. It should be noted that by designing the projection 51 to be bigger and stiffer, the potential breakage can be reduced, but in that case, since the outer diameter of a portion including the projection 51 of the flange 50 becomes larger than the inner diameter of the screw attachment 70, the flange 50 cannot be inserted into the screw attachment 70.

SUMMARY OF THE INVENTION

The present invention provides a push-button switch, a selector switch, and a fixing component of these switches, in which a reduced number of component parts, and a more secure connection of a flange with a screw attachment can be achieved.

The fixing component according to the present invention is a fixing component for a switch including a flange, a ring attachment, and a screw attachment having a screw structure to be screwed in the ring attachment, the switch being attached to an attachment panel by sandwiching an edge of a mounting hole of the attachment panel between the flange and the screw attachment. The flange includes a projection provided on an outer peripheral surface having a circular cross section. The screw attachment includes, on an inner peripheral surface having a circular cross section, an insertion area into which the projection of the flange is inserted, a projection engaging part into which the projection of the flange is fitted, and an interference projection which is formed between the projection engaging part and the insertion area and has a smaller inner diameter than diameters of the projection engaging part and the insertion area. The projection has a first projecting portion extending along an outer peripheral surface in a circumferential direction and a second projecting portion extending in a direction perpendicular to the circumferential direction. The projection engaging part is formed by a guiding groove and a fitting groove. The first projecting portion is fitted into the guiding groove, and the second projecting portion traverses over the interference projection to be fitted into the fitting groove when the flange and the screw attachment are rotated relatively in one predetermined circumferential direction.

According to the above configuration, the projection engaging part is formed by a guiding groove and a fitting groove. The first projecting portion is fitted into the guiding groove, and the second projecting portion traverses over the interference projection to be fitted into the fitting groove when the flange and the screw attachment are rotated relatively in one predetermined circumferential direction.

Accordingly, in a state where a projection of the flange is fitted into the projection engaging part, an end surface along a circumferential direction of the first projecting portion faces a wall surface of the guiding groove, thereby preventing the projection of the flange from moving in a direction perpendicular to the circumferential direction. In this state, an end surface perpendicular to the circumferential direction of the second projecting portion faces a wall surface of the fitting groove, thereby preventing the projection of the flange from moving in the circumferential direction. Thus, unlike the conventional art, it is not necessary to provide an additional member for preventing movement of the projection with the use of a set screw, or the like. Accordingly, the number of component parts is reduced as there is no set screw, and no screwing process is required.

Since the projection traverses over the interference projection, the projection of the flange may be thicker to the extent that the projection can be fitted into the insertion area. Therefore, there can be provided a fixing component, in which a reduced number of component parts and a more secure connection of the flange with the screw attachment can be achieved.

In the fixing component according to the present invention, the second projecting portion extends from the first projecting portion, and an end surface along a circumferential direction of the interference projection is a part of the wall surface of the guiding groove.

According to the above configuration, the end surface along the circumferential direction of the interference projection is a part of the wall surface of the guiding groove, and hence performs the function of guiding the first projecting portion of the flange, as well as the function of preventing movement of the projection of the flange in a direction perpendicular to the circumferential direction. Accordingly, the end surface along the circumferential direction of the interference projection can be effectively utilized. In addition to that, since the second projecting portion extends from the first projecting portion, the guiding groove can be shortened compared to a configuration in which the second projecting portion does not extend from the first projecting portion. Therefore, the space in the screw attachment can be effectively utilized.

In the fixing component according to the present invention, an end surface of the second projecting portion at a forward side thereof is a slope inclined at an acute angle from the forward side to a rearward side thereof, and wherein an end surface of the rearward side is a perpendicular surface.

Further in the fixing component according to the present invention, an end surface at a forward side of the interference projection is a perpendicular surface, and an end surface at a rearward side of the interference projection is a slope inclined at an acute angle from the rearward side to the forward side.

According to the above configuration, since the slope of the second projecting portion traverses over the slope of the interference projection while keeping in contact with the slope of the interference projection, the flange can be smoothly rotated with respect to the screw attachment. In a state where the projection is fitted into the projection engaging part, since the perpendicular surface of the second projecting portion and the perpendicular surface of the interference projection face each other, even in a case where a force is applied in a direction from the projection engaging part to the insertion area, the second projecting portion of the flange hardly traverses over the interference projection.

In order to solve the problems described above, the push-button switch and the selector switch according to the present invention include the fixing component.

According to the above configuration, it is possible to provide a push-button switch and a selector switch, in which a more secure connection of the flange with the screw attachment can be achieved.

In accordance with the present invention, the number of component parts can be reduced, and a more secure connection of the flange with the screw attachment can be achieved.

BRIEF DESCRIPTION OF THE DRAWINGS

FIGS. 9A to 9C are views illustrating a flange and a screw attachment of an operation unit of the conventional push-button switch.

DETAILED DESCRIPTION

With reference to the drawings, an embodiment of the present invention will be described. In the following description, the same components will be given the same reference symbols. Names and functions of the components are also the same. Therefore, detailed description thereof will not be repeated.

Figure 1A:
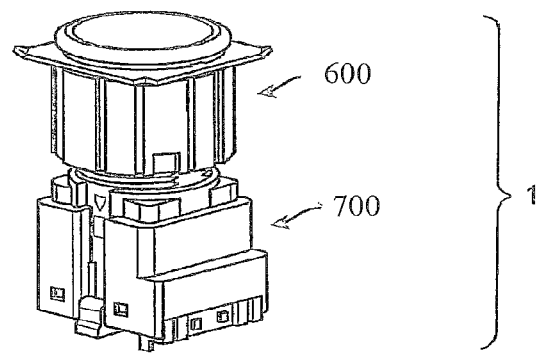
FIGS. 1A and 1B are perspective views illustrating one example of a push-button switch according to the present embodiment.
Figure 1B:
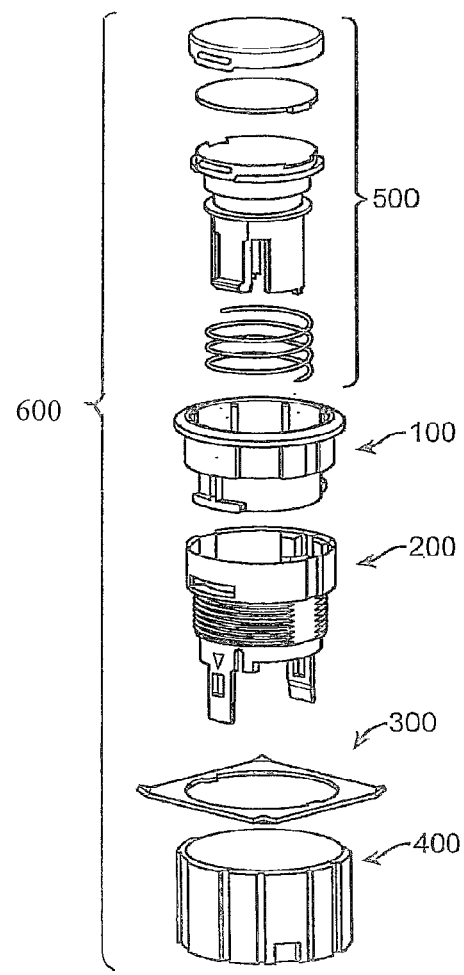

FIGS. 1A and 1B are perspective views illustrating one example of a push-button switch 1 according to the present embodiment. FIG. 1A is a perspective view illustrating an appearance of the push-button switch 1, and FIG. 1B is an exploded perspective view of the push-button switch 1. As illustrated in FIGS. 1A and 1B, the push-button switch 1 is a switch fixed to an attachment panel (device casing). The push-button switch 1 is includes an operation unit and a switch unit. Every time a pressing portion 500 in the operation unit is pressed, the switch unit is switched between the on-state and off-state. The pressing portion 500 includes button components such as a spring, a slider, and a cap for achieving a piston movement.

Figure 2A:
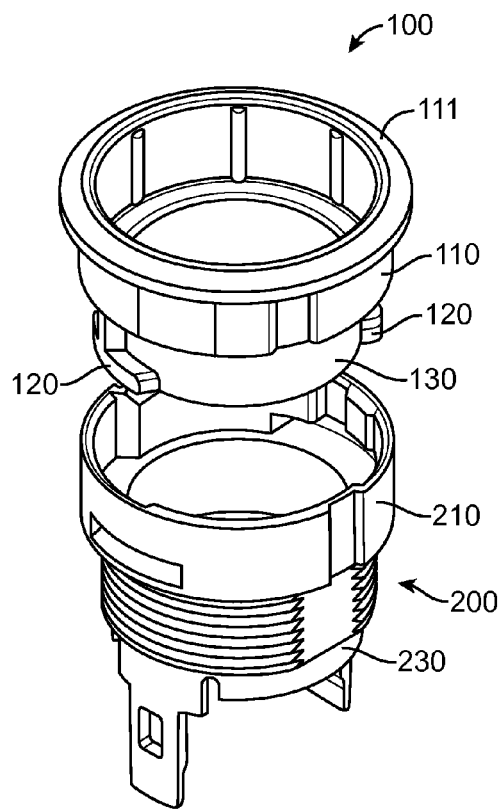
FIGS. 2A and 2B are views illustrating a flange and a screw attachment of an operation unit.
Figure 2B:
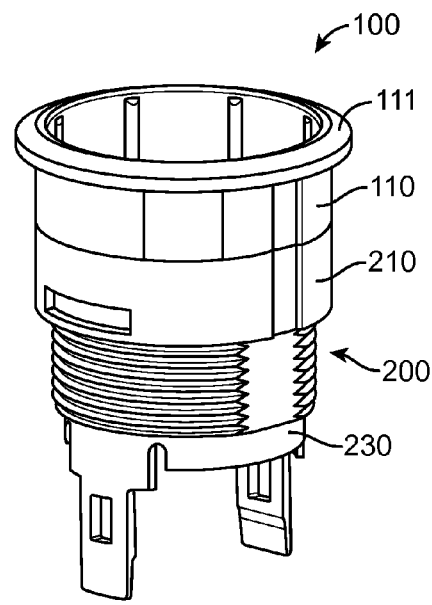
Figure 3:
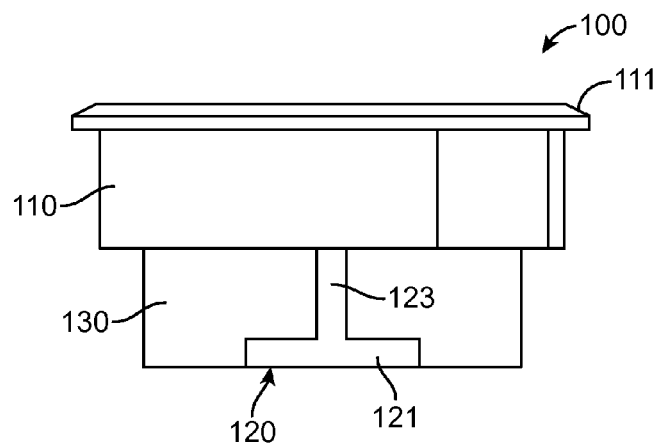
FIG. 3 is a front view of the flange.
Figure 4:
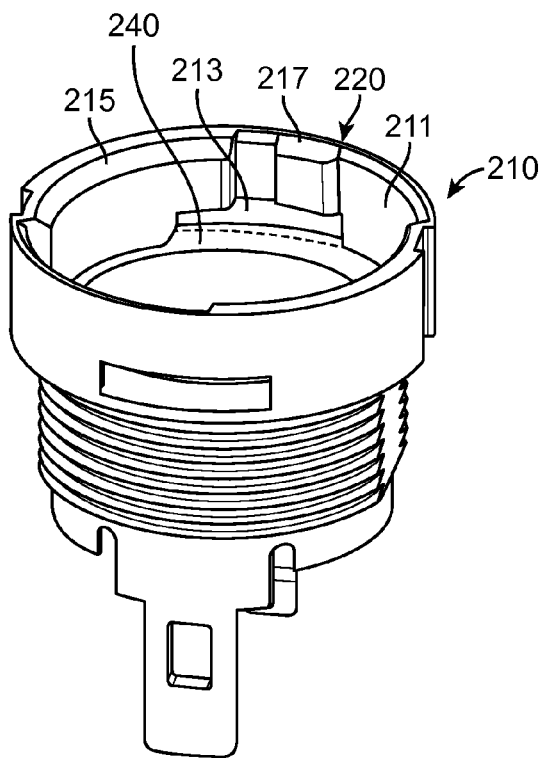
FIG. 4 is an enlarged perspective view of the screw attachment.

FIGS. 2A and 2B are views illustrating a flange 100 and a screw attachment 200 of the operation unit. FIG. 2A is a perspective view illustrating the flange 100 and screw attachment 200 before assembly, and FIG. 2B is a perspective view illustrating the flange 100 and screw attachment 200 after assembly. FIG. 3 is a front view of the flange 100. FIG. 4 is an enlarged perspective view of the screw attachment 200.

As illustrated in FIGS. 2A, 2B, 3 and 4, the flange 100 and the screw attachment 200 each have a substantially cylindrical shape, and have therein a spring, a slider, and the like for achieving a piston movement of the push button.

The flange 100 has a projection 120 on a lower outer peripheral surface to be connected with the screw attachment 200. Correspondingly, on an upper inner peripheral surface of the screw attachment 200 where the screw attachment is contacted with the flange 100, the screw attachment 200 has an insertion area 211 into which the projection 120 of the flange 100 is inserted, and has a projection engaging part (a fitting groove, a guiding groove) 213 with which the projection 120 of the flange 100 is engaged to connect the flange 100 to the screw attachment 200. The projection engaging part 213 is engaged with the projection 120 to regulate movement of the flange and the screw attachment in the circumferential direction (rotating direction) and movement of the flange and the screw attachment in the vertical direction.

It should be noted that each of the flange 100 and the screw attachment 200 is made of, for example, PBT containing 30% of glass, but may be made of a different material. The flange 100 and the screw attachment 200 may be composed of the same material or different materials.

The flange 100 and the screw attachment 200 are connected in such a manner that a lower portion of the flange 100 is inserted into an upper portion of the screw attachment 200 with the projection 120 aligned with the insertion area 211, and then the flange 100 is relatively rotated with respect to the screw attachment 200 to have the projection 120 fitted into the projection engaging part 213. It should be noted that the direction of rotating the flange 100 with respect to the screw attachment 200 in the direction of fitting the projection 120 into the projection engaging part 213 is hereinafter referred to as the fitting and rotating direction.

The flange 100 has two cylindrical portions each having different diameters (an inner diameter and an outer diameter). An upper portion corresponds to the cylindrical portion having a larger diameter (hereinafter, referred to as a "first cylindrical portion") 110, and a lower portion corresponds to the cylindrical portion having a smaller diameter (hereinafter, referred to as a "second cylindrical portion") 130.

The first cylindrical portion 110 has a flange portion 111 at an upper portion thereof. The second cylindrical portion 130 has two of the projections 120 on an outer peripheral surface thereof. The two projections 120 have the same shapes, and are disposed symmetrically with respect to the central axis of the second cylindrical portion 130.

FIGS. 1A and 1B are perspective views illustrating one example of a push-button switch 1 according to the present embodiment. FIG. 1A is a perspective view illustrating an appearance of the push-button switch 1, and FIG. 1B is an exploded perspective view of the push-button switch 1. As illustrated in FIGS. 1A and 1B, the push-button switch 1 is a switch fixed to an attachment panel (device casing). The push-button switch 1 is includes an operation unit 600 and a switch unit 700. Every time a pressing portion 500 in the operation unit 600 is pressed, the switch unit 700 is switched between the on-state and off-state. The pressing portion 500 includes button components such as a spring, a slider, and a cap for achieving a piston movement.

FIGS. 2A and 2B are views illustrating a flange 100 and a screw attachment 200 of the operation unit 600. FIG. 2A is a perspective view illustrating the flange 100 and screw attachment 200 before assembly, and FIG. 2B is a perspective view illustrating the flange 100 and screw attachment 200 after assembly. FIG. 3 is a front view of the flange 100. FIG. 4 is an enlarged perspective view of the screw attachment 200.

The screw attachment 200 has two cylindrical portions which have different diameters (an inner diameter and an outer diameter). An upper portion corresponds to the cylindrical portion having a larger diameter (hereinafter, referred to as a "third cylindrical portion") 210, and a lower portion corresponds to the cylindrical portion having a smaller diameter (hereinafter, referred to as a "fourth cylindrical portion") 230.

The boundary between third cylindrical portion 210 and the fourth cylindrical portion 230 is a horizontal area 240 parallel to the radial direction of the screw attachment 200. Accordingly, the horizontal area 240 positioned on the boundary between the third cylindrical portion 210 and the fourth cylindrical portion 230 supports the bottom of the flange 100 when connected to the screw attachment 200.

The third cylindrical portion 210 has a structure in which the inner diameter thereof varies depending on the area of the inner peripheral surface. Specifically, the flange 100 has a first inner diameter area 220 (within the dashed area) which has an inner diameter approximately as large as the outer diameter of a portion of the second cylindrical portion 130 including the projection 120, a second inner diameter area 215 which has an inner diameter approximately as large as the outer diameter of a portion of the second cylindrical portion 130 excluding the projection 120, and a third inner diameter area 217 which has an inner diameter between the diameters of the first inner diameter area 220 and the second inner diameter area 215.

In the present embodiment, each difference of the inner diameters among the first, the second, and the third inner diameter areas 220, 215, and 217 is configured by a difference in thickness. In other words, the second inner diameter area 215 is designed to be thicker than the first inner diameter area 220, and the third inner diameter area 217 is designed to be thicker than the first inner diameter area 220 and to be thinner than the second inner diameter area 215. Two sets of the first, the second, and the third inner diameter areas 220, 215, and 217 are disposed symmetrically with respect to the central axis of the third cylindrical portion 210.

The above-described insertion area 211 and the projection engaging part 213 are formed in the first inner diameter area 220. The insertion area 211 has a transverse length approximately as long as a length in the circumferential direction of the first projecting portion 121 of the flange 100 and a longitudinal length which extends from the upper portion to the lower portion of the third cylindrical portion 210, where the transverse length is a length in the circumferential direction and the longitudinal length is a length in the direction perpendicular thereto.

The third inner diameter area 217 is positioned between the insertion area 211 and the projection engaging part 213, and includes an interference projection which the second projecting portion 123 of the projection 120 traverses in one direction when the flange 100 is rotated in the fitting and rotating direction to be attached to the screw attachment 200. The interference projection 217, includes an end surface at a forward side thereof in the fitting and rotating direction, where the end surface at the forward side is a surface perpendicular to the inner peripheral surface. The interference projection 217 includes an end surface at a rearward side thereof in the fitting and rotating direction, where the end surface at the rearward side is a slope inclined at an acute angle from the rearward side to the forward side. The interference projection 217 preferably has a flat surface between the slope and the perpendicular surface. That is, the cross-sectional profile of the interference projection 217 taken along the radial direction of the third cylindrical portion 210 preferably has a trapezoidal shape.

The projection engaging part 213 is eventually fitted into the projection 120 of the flange 100 to allow the flange 100 to be connected to the screw attachment 200, and hence has an complementary shape to the projection 120.

The rearward side of the projection engaging part 213 in the fitting and rotating direction adjoins the insertion area 211, and the forward side adjoins the second inner diameter area 215. A lower end of the projection engaging part 213 is the horizontal area 240 positioned on the boundary between the third cylindrical portion 210 and the fourth cylindrical portion 230.

The rearward side of the projection engaging part 213 in the fitting and rotating direction adjoins the interference projection 217, and the forward side thereof adjoins the second inner diameter area 215.

The interference projection 217 and the projection engaging part 213 are positioned in the forward side of the insertion area 211 in the fitting and rotating direction of the flange 100, and the second inner diameter area 215 is positioned in the forward side of the projection engaging part 213 in the fitting and rotating direction of the flange 100.

The fourth cylindrical portion 230 includes a plurality of grooves having a predetermined spacing at an outer periphery thereof. The plurality of grooves of the fourth cylindrical portion 230 and a plurality of grooves provided on the ring attachment 400 are meshed with each other, such that the screw attachment 200 and the ring attachment 400 are fastened by a screw structure. When being fixed to the mounting hole of the device casing, the screw attachment 200 is fastened by the ring attachment 400 while the support member 300 is being fitted thereto.

Figure 5:
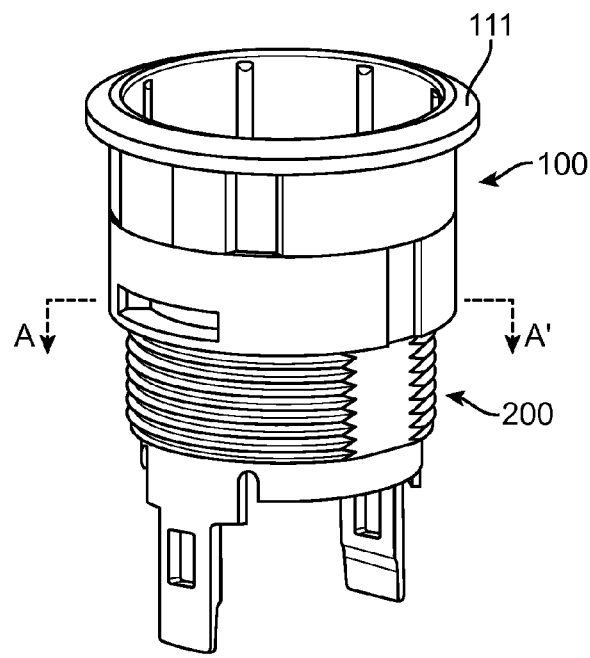
FIG. 5 is a view illustrating the flange with a projection inserted into an insertion area of the screw attachment.
Figure 6A:
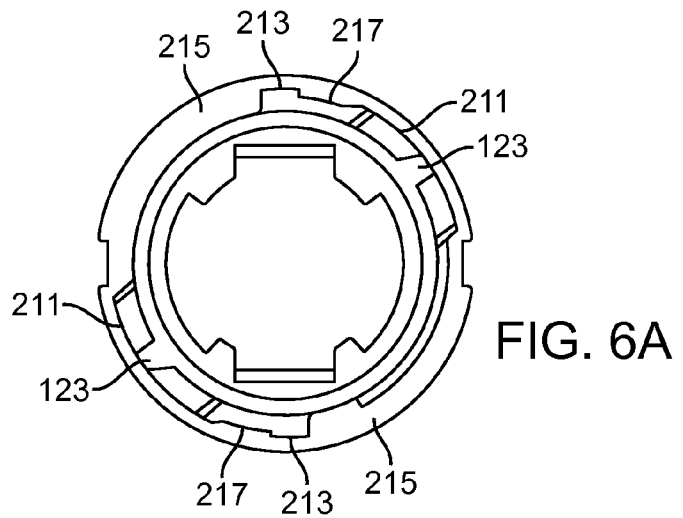
FIGS. 6A to 6C are views illustrating a sequence for connecting the flange with the screw attachment in an A-A' line cross section of FIG. 5.
Figure 6B:
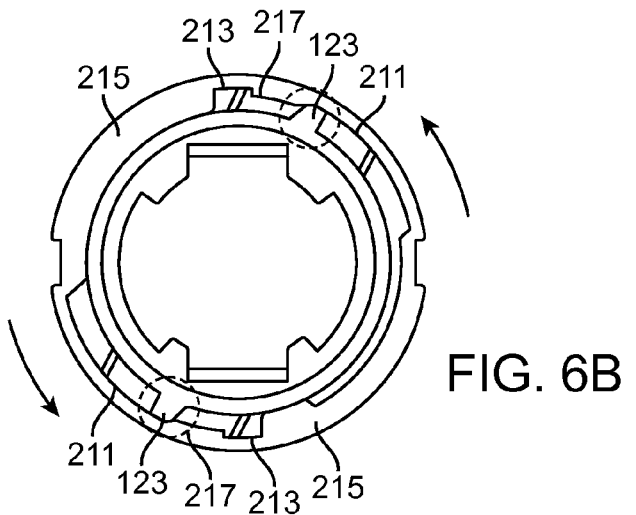
Figure 6C:
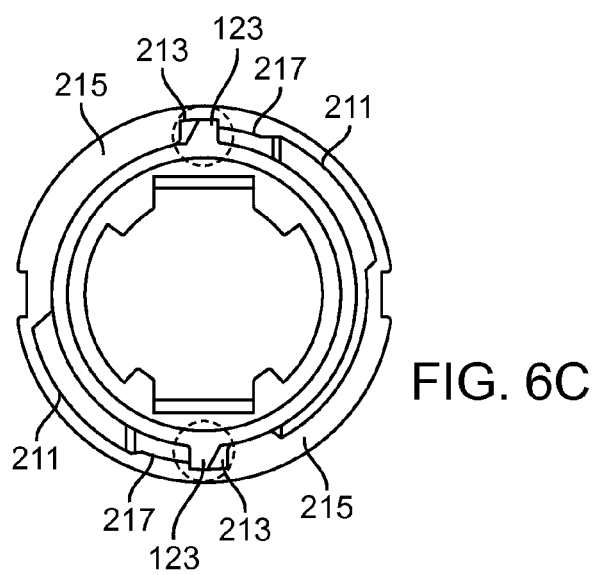
Figure 7:
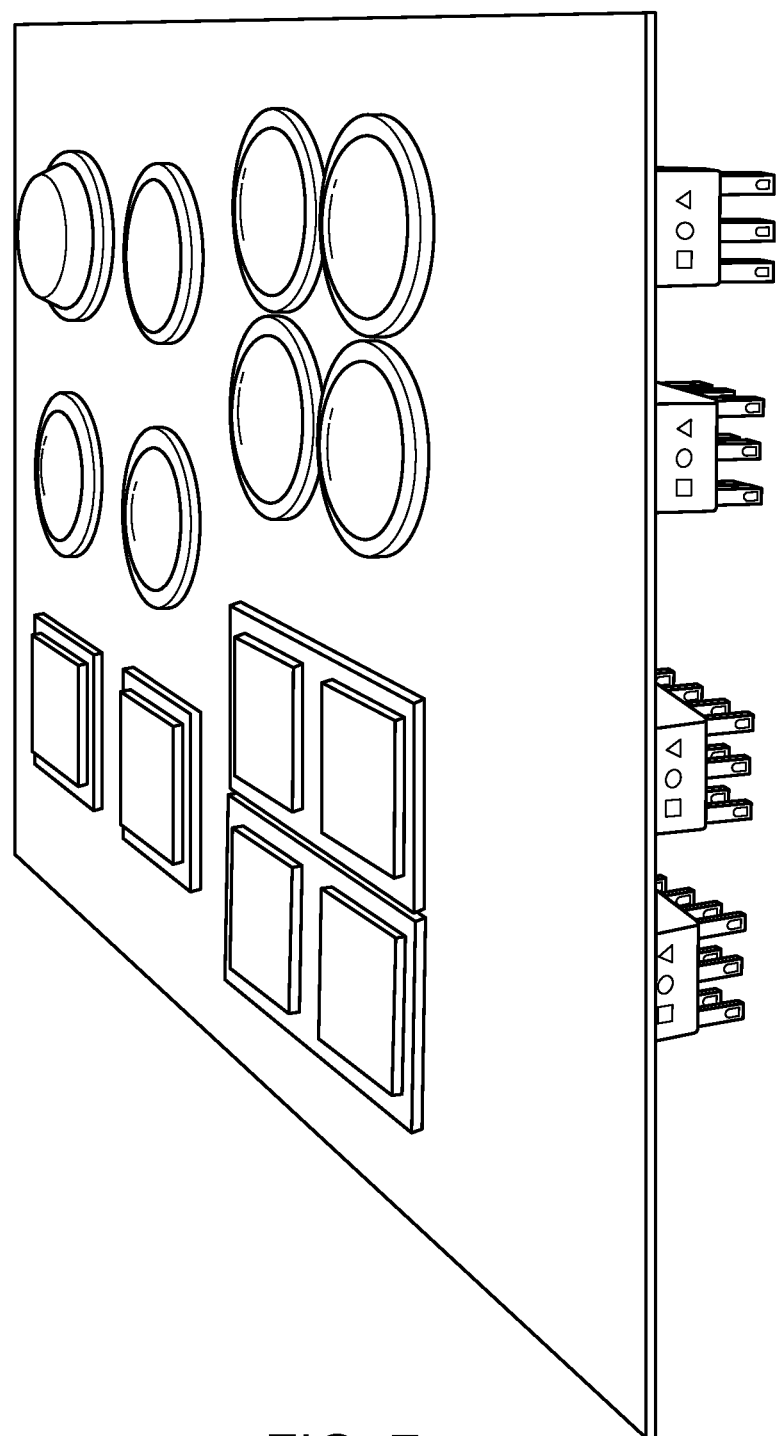
FIG. 7 is a view of a conventional push-button switch fixed to a device casing.
Figures 8A, 8B:
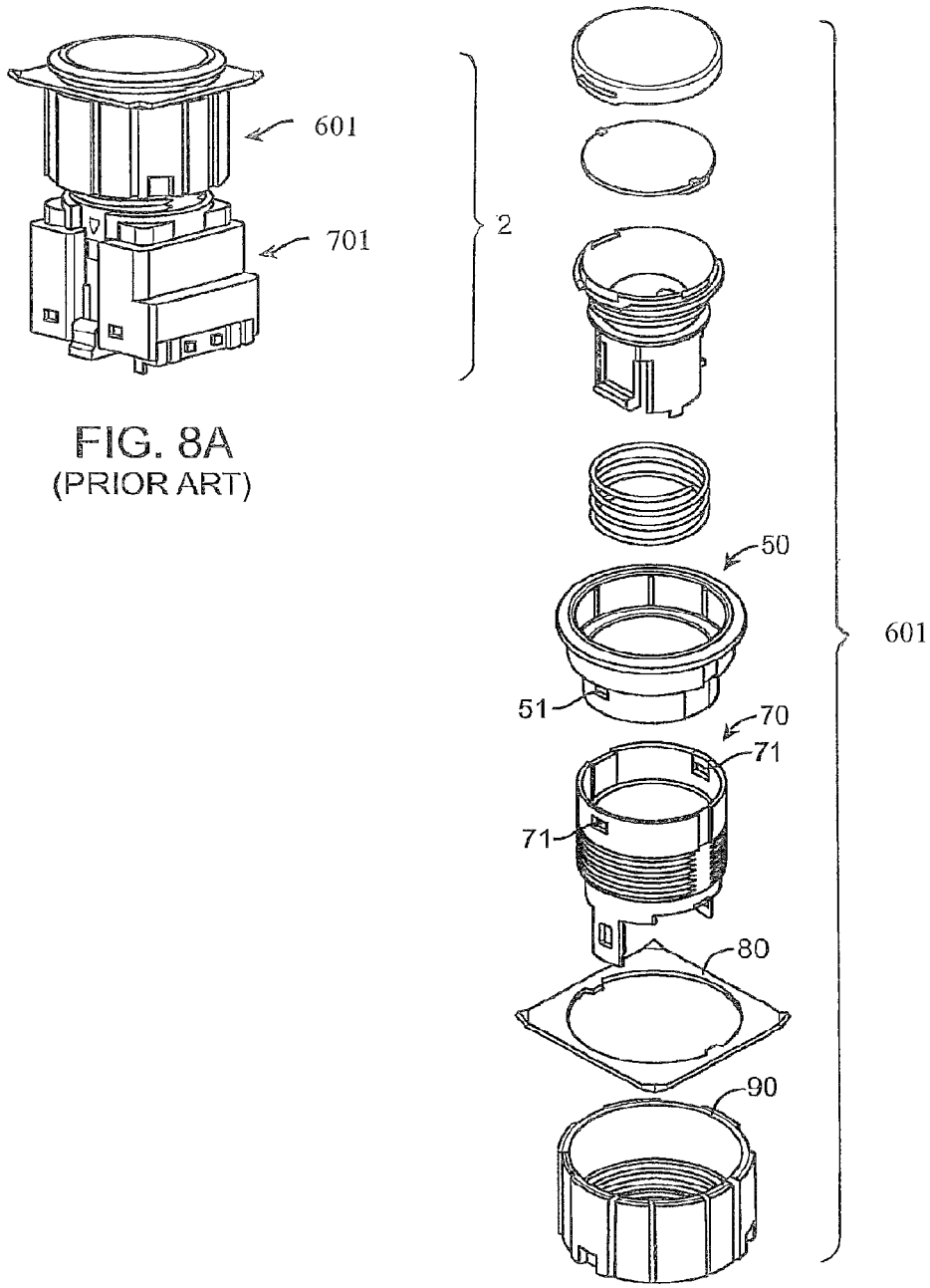
FIGS. 8A and 8B are perspective views illustrating the conventional push-button switch.

A sequence for connecting the flange with the screw attachment will be described with reference to FIGS. 5, 6A, 6B, and 6C. FIG. 5 is a view illustrating the flange with a projection inserted into an insertion area of the screw attachment. FIGS. 6A to 6C are views illustrating the sequence for connecting the flange with the screw attachment in an A-A' line cross section of FIG. 5.

Two projections 120 of the flange 100 and two insertion areas 211 of the screw attachment 200 are fitted, and then the second cylindrical portion 130 of the flange 100 is inserted into the third cylindrical portion 210 of the screw attachment 200. Here, the second cylindrical portion 130 is inserted into the third cylindrical portion 210 until the bottom of the second cylindrical portion 130 is in contact with the horizontal area 240 which is disposed at the boundary between the third cylindrical portion 210 and the fourth cylindrical portion 230. Then, after the second cylindrical portion 130 of the flange 100 is inserted into the third cylindrical portion 210 of the screw attachment 200, the flange 100 and the screw attachment 200 are relatively rotated in the direction from the insertion area 211 to the projection engaging part 213.

While the flange 100 and the screw attachment 200 are being relatively rotated in the direction from the insertion area 211 to the projection engaging part 213, the second projecting portion 123 of the flange 100 is brought into contact with the interference projection 217. When the second projecting portion 123 of the flange 100 traverses over the interference projection 217, the entire projection 120 is fitted into the projection engaging part 213. During the period, in which the second projecting portion 123 of the flange 100 is brought into contact with the interference projection 217 and traverses over the interference projection 217, the second projecting portion 123 of the flange 100 sequentially goes through the following three steps.

First, in the first step, the slope of the second projecting portion 123 traverses up to a position just before the flat portion of the interference projection 217, while keeping in contact with the slope of the interference projection 217. Then, in the second step, the flat portion of the second projecting portion 123 moves to a position just before the perpendicular surface of the interference projection 217, while keeping in contact with the flat portion of the interference projection 217. Finally, in the third step, the second projecting portion 123 passes over the interference projection 217 and is fitted into the projection engaging part 213.

As described above, in the second step, since the slope of the second projecting portion 123 traverses up the slope of the interference projection 217 while keeping in contact with the slope of the interference projection 217, the flange 100 can be smoothly rotated with respect to the screw attachment 200.

In the third step, when the entire projection 120 is fitted into the projection engaging part 213, since the perpendicular surface of the second projecting portion 123 and the perpendicular surface of the projection engaging part 213 face each other, even in a case where a force is applied in a direction from the projection engaging part 213 to the insertion area 211, the second projecting portion 123 of the flange 100 is prevented from traversing over the interference projection 217. Since the second projecting portion 123 is thicker in the circumferential direction, even in a case where a force is applied in the circumferential direction, the possibility of damaging the projection is decreased.

The second inner diameter area 215 is positioned at the forward side of the projection engaging part 213 in the fitting and rotating direction. Hence, even in a case where the flange 100 is rotated with respect to the screw attachment 200, the inner diameter in the second inner diameter area 215 is set to be approximately as large as the outer diameter of the second cylindrical portion 130 of the flange 100. Therefore, the projection 120 of the flange 100 is prevented from traversing over the second inner diameter area 215.

Further, when the entire projection 120 is fitted into the projection engaging part 213, since the first projecting portion 121 of the flange 100 faces a surface parallel to the radial direction of one of two end surfaces perpendicular to the outer peripheral surface (upper side) of the interference projection 217 and a surface parallel to the radial direction of the second inner diameter area 215, and since the other end surface perpendicular to the outer peripheral surface (lower side) faces the horizontal area 240 which is positioned between the third cylindrical portion 210 and the fourth cylindrical portion 230, even in a case where a force is applied in a perpendicular direction, the first projecting portion 121 of the flange 100 does not traverse over the second inner diameter area 215, the projection engaging part 213, and the horizontal area 240 which is positioned between the third cylindrical portion 210 and the fourth cylindrical portion 230.

Accordingly, even in a case where a force in the circumferential direction and a force perpendicular to the circumferential direction are applied, the projection 120 of the flange 100 does not come out of the projection engaging part 213. Additionally, since fine adjustment of the interference projection 217 is readily available, a modification is made with ease such that the second projecting portion 123 of the flange 100 is prevented from traverses climbing over the interference projection 217 of the screw attachment 200.

As described above, the fixing component according to the present embodiment is a fixing component for a switch including a flange 100, a ring attachment, and a screw attachment 200 having a screw structure to be screwed in the ring attachment, the switch being attached to an attachment panel by sandwiching an edge of a mounting hole of the attachment panel between the flange 100 and the screw attachment 200. The flange 100 includes the projection 120 provided on an outer peripheral surface having a circular cross section. The screw attachment 200 includes, on an inner peripheral surface having a circular cross section, the insertion area 211 into which the projection 120 of the flange 100 is inserted, the projection engaging part 213 into which the projection 120 of the flange 100 is fitted, and the interference projection 217 which is formed between the projection engaging part 213 and the insertion area 211 and has a smaller inner diameter than diameters of the projection engaging part 213 and the insertion area 211. The projection 120 has the first projecting portion 121 extending along an outer peripheral surface in a circumferential direction and the second projecting portion 123 extending in a direction perpendicular to the circumferential direction. The projection engaging part 213 is formed by a guiding groove and a fitting groove. The first projecting portion 121 is fitted into the guiding groove, and the second projecting portion 123 traverses over the interference projection 127 to be fitted into the fitting groove when the flange 100 and the screw attachment 200 are rotated relatively in one predetermined circumferential direction.

According to this configuration, the projection engaging part 213 is formed by a guiding groove and a fitting groove. When the flange 100 and the screw attachment 200 are rotated relatively in one predetermined circumferential direction, the first projecting portion 121 is fitted into the guiding groove, and the second projecting portion 123 traverses over the interference projection 127 and is fitted into the fitting groove.

Accordingly, in a state where a projection 120 of the flange 100 is fitted into the projection engaging part 213, an end surface along the circumferential direction of the first projecting portion 121 faces the wall surface of the guiding groove, thereby preventing movement of the projection 120 of the flange 100 in a direction perpendicular to the circumferential direction. In addition to that, in this state, an end surface perpendicular to the circumferential direction of the second projecting portion 123 faces the wall surface of the fitting groove, thereby preventing movement of the projection 120 of the flange 100 in the circumferential direction.

Thus, unlike the conventional art, it is not necessary to provide an additional member for preventing movement of the projection with the use of a set screw, or the like. Accordingly, the number of component parts is reduced as there is no set screw, and no screwing process is required. In addition to that, since the projection 120 traverses over the interference projection 217, the projection 120 of the flange 100 may be thicker to the extent that the projection 120 can be fitted into the insertion area 211. Therefore, the number of components parts can be reduced and a more secure connection of a flange with a screw attachment can be achieved.

It should be noted that although in the present embodiment, a push-button switch is used as an example for description, the present embodiment can be adopted also in other switches, for example, a selector switch which opens and closes contacts in a forcible manner by twisting a knob.

The present invention is not limited to the above-described embodiment, and various modifications may be made within the scope of the Claims. In other words, the embodiments obtained by combining the technical means appropriately modified within the scope of the Claims are encompassed in the technical scope of the present invention.

There has thus been shown and described a push-button switch, a selector switch and a fixing component using the same which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A fixing component comprising:
    a flange;
    a ring attachment; and
    a screw attachment having a screw structure to be screwed in the ring attachment,
    wherein
    the flange comprising a projection provided on an outer peripheral surface having a circular cross section,
    the screw attachment comprising, on an inner peripheral surface having a circular cross section, an insertion area into which the projection of the flange is inserted, a projection engaging part into which the projection of the flange is fitted, and an interference projection which is formed between the projection engaging part and the insertion area and has a smaller inner diameter than diameters of the projection engaging part and the insertion area,
    the projection of the flange comprising a first projecting portion extending along an outer peripheral surface in a circumferential direction and a second projecting portion extending in a direction perpendicular to the circumferential direction, wherein the projection engaging part is formed by a guiding groove and a fitting groove, wherein the first projecting portion is fitted into the guiding groove, and the second projecting portion is configured to traverse over the interference projection to be fitted into the fitting groove when the flange and the screw attachment are rotated relatively in one predetermined circumferential direction, wherein an end surface of the second projecting portion at a forward side thereof forms a straight slope inclined at an acute angle from the forward side to a rearward side thereof, wherein an end surface of the rearward side forms a straight perpendicular surface, and wherein an end surface at a forward side of the interference projection forms a straight perpendicular surface, and an end surface at a rearward side of the interference projection forms a straight slope inclined at an acute angle from the rearward side to the forward side.

2. The fixing component according to claim 1, wherein the second projecting portion extends from the first projecting portion, and an end surface in a circumferential direction of the interference projection is a part of a wall surface of the guiding groove.

3. A push-button switch comprising the fixing component according to claim 1.

4. A selector switch comprising the fixing component according to claim 1.

5. The fixing component according to claim 2, wherein an end surface at a forward side of the interference projection is a perpendicular surface, and an end surface at a rearward side of the interference projection is a slope inclined at an acute angle from the rearward side to the forward side.

* * * * *